United States Patent
Hao et al.

(10) Patent No.: US 11,424,790 B2
(45) Date of Patent: Aug. 23, 2022

(54) TECHNIQUES FOR FREQUENCY DOMAIN RESTRICTION FOR CHANNEL STATE INFORMATION WITH FREQUENCY DOMAIN COMPRESSION

(71) Applicant: QUALCOMM Incorporated, San Diego, CA (US)

(72) Inventors: Chenxi Hao, Beijing (CN); Parisa Cheraghi, Cambridge (GB); Yu Zhang, Beijing (CN); Lei Xiao, San Jose, CA (US); Peter Gaal, San Diego, CA (US); Wanshi Chen, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/424,097

(22) PCT Filed: Jan. 20, 2020

(86) PCT No.: PCT/CN2020/073168
§ 371 (c)(1),
(2) Date: Jul. 19, 2021

(87) PCT Pub. No.: WO2020/151644
PCT Pub. Date: Jul. 30, 2020

(65) Prior Publication Data
US 2022/0094400 A1    Mar. 24, 2022

(51) Int. Cl.
*H04B 7/02* (2018.01)
*H04B 7/0417* (2017.01)
*H04B 7/0456* (2017.01)

(52) U.S. Cl.
CPC ......... *H04B 7/0417* (2013.01); *H04B 7/0456* (2013.01)

(58) Field of Classification Search
CPC ............................ H04B 7/0417; H04B 7/0456
(Continued)

(56) References Cited

U.S. PATENT DOCUMENTS 9,203,491 B2 * 12/2015 Wang ................. H04B 7/0617
2013/0308715 A1 * 11/2013 Nam .................. H04B 7/0626
375/267

(Continued)

FOREIGN PATENT DOCUMENTS

| CN | 108370266 A | 8/2018 |
| WO | 2016183737 A1 | 11/2016 |
| WO | 2017028007 A1 | 2/2017 |

OTHER PUBLICATIONS

SAMSUNG: "Outcome of Offline Session for CSI Enhancement for MU-MIMO Support," R1-1814131, 3GPP TSG RAN G1 Meeting #95, Nov. 16, 2018 (Nov. 16, 2018), section 2, 3 pages.*

(Continued)

*Primary Examiner* — Helene E Tayong
(74) *Attorney, Agent, or Firm* — QUALCOMM Incorporated

(57) ABSTRACT

A user equipment (UE) may utilize frequency domain (FD) compression for reporting channel state information (CSI) including a precoding matrix indicator (PMI). The UE may receive a CSI configuration specifying a first set of configured FD units to be reported. The UE may determine a first number of FD units based on the first set of configured FD units. The UE may select a second number of FD units that is greater than or equal to the first number of FD units. The UE may calculate, for one or more layers, a PMI for a second set of FD units including a number of FD units equal to the second number of FD units. The UE may allocate, according to a mapping rule, a number of PMIs for the first set of FD units to a subset of the PMIs for the second set of FD units.

30 Claims, 9 Drawing Sheets

(58) Field of Classification Search
USPC .......................................................... 375/267
See application file for complete search history.

(56) References Cited

U.S. PATENT DOCUMENTS

| | | | | |
|---|---|---|---|---|
| 2013/0343216 | A1* | 12/2013 | Su .................. | H04B 7/0417 370/252 |
| 2014/0029463 | A1* | 1/2014 | Su .................. | H04B 7/0689 370/252 |
| 2014/0177745 | A1* | 6/2014 | Krishnamurthy .... | H04B 7/0413 375/267 |
| 2015/0327246 | A1* | 11/2015 | Kim ................. | H04B 7/0632 370/329 |

OTHER PUBLICATIONS

Huawel et al., "Remaining Issues on CSI Measurement" 3GPP TSG RAN WG1 Meeting #93, R1-1805949, May 25, 2018 (May 25, 2018), 6 Pages.*
International Search Report issued in corresponding International Application No. PCT/CN2020/073168 dated Apr. 9, 2020.
International Search Report and Written Opinion—PCT/CN2019/072525—ISA/EPO—dated Oct. 12, 2019.
Qualcomm Incorporated: "Enhancements for coordinated scheduling/beamforming with FD-MIMOs", 3GPP TSG-RAN WG1 #88, R1-1702575, Dec. 31, 2017 (Dec. 31, 2017), pp. 1-3, No. http://www.3gpp.org/ftp/Meetings_3GPP_SYNC/RAN1/Docs/.

* cited by examiner

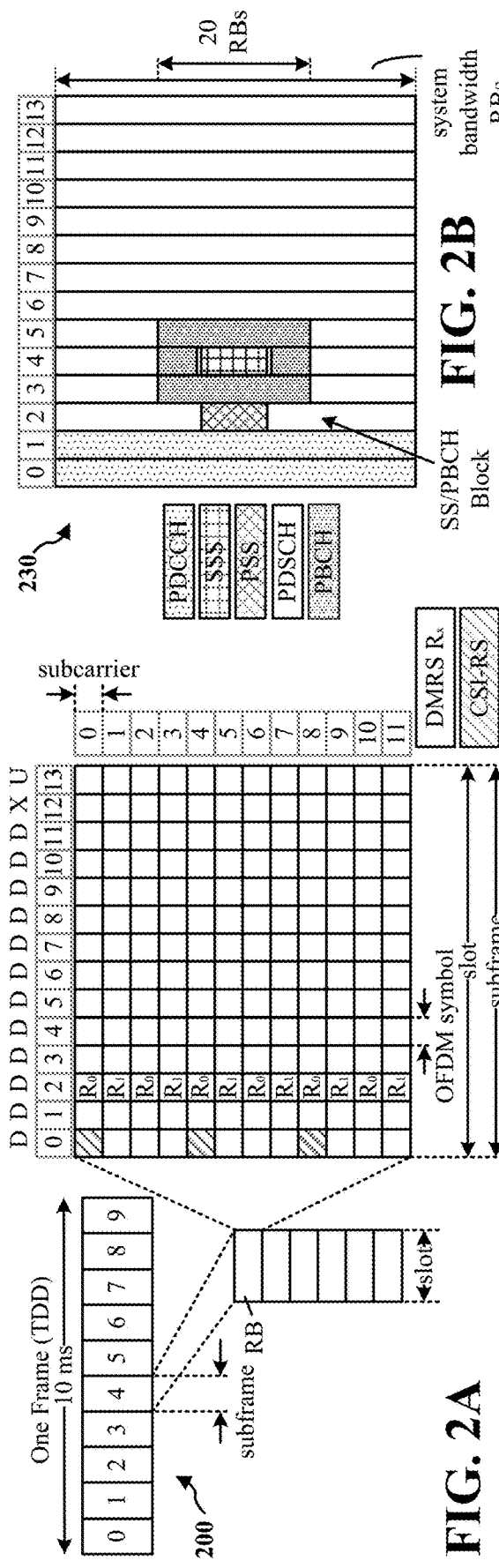
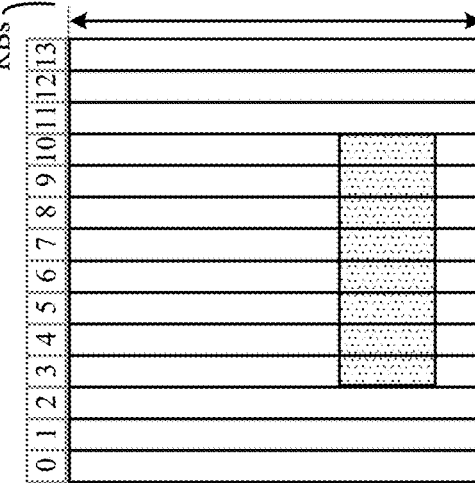
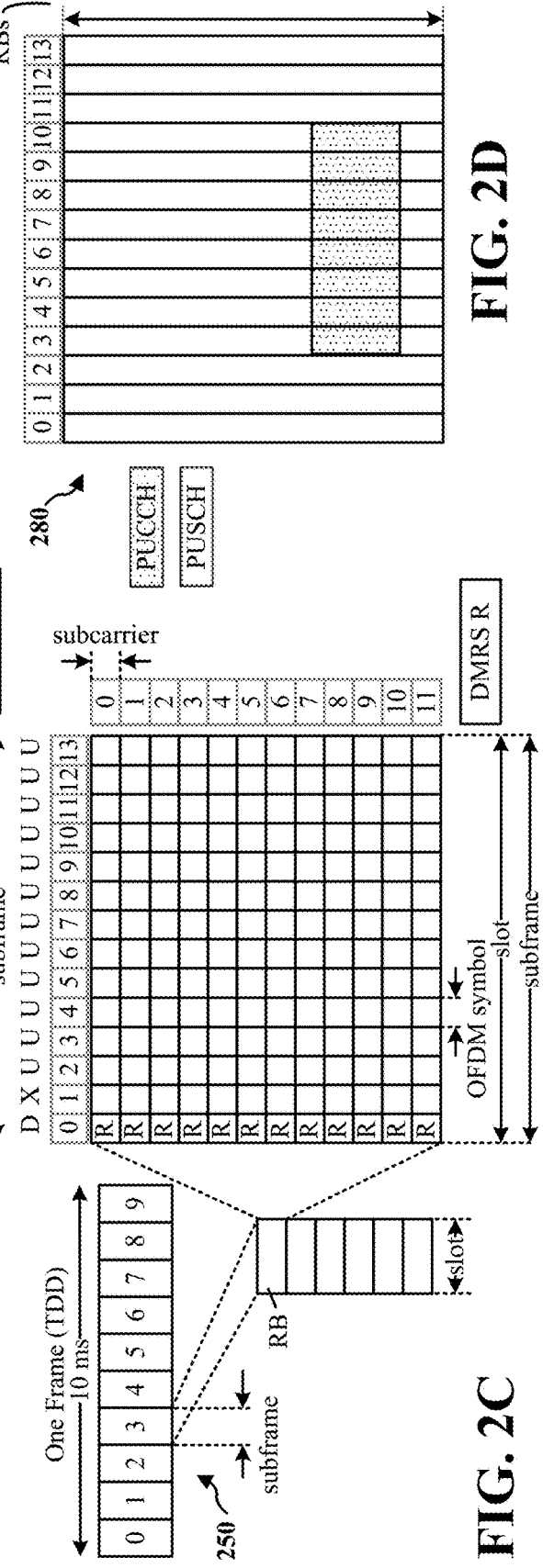
FIG. 2A
FIG. 2B
FIG. 2C
FIG. 2D

TECHNIQUES FOR FREQUENCY DOMAIN RESTRICTION FOR CHANNEL STATE INFORMATION WITH FREQUENCY DOMAIN COMPRESSION

This application is a 35 U.S.C. § 371 National Phase of PCT Application No. PCT/CN2020/073168, filed Jan. 20, 2020, which claims priority to International Application No. PCT/CN2019/072525, titled "TECHNIQUES FOR FREQUENCY DOMAIN RESTRICTION FOR CHANNEL STATE INFORMATION WITH FREQUENCY DOMAIN COMPRESSION," filed Jan. 21, 2019, which is assigned to the assignee hereof, and incorporated herein by reference in its entirety.

BACKGROUND

The present disclosure relates generally to communication systems, and more particularly, to channel state information reporting.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

A user equipment (UE) may transmit channel state information (CSI) to the network to improve downlink transmissions. For example, the CSI may include a channel quality indicator (CQI) and/or beamforming information such as a pre-coding matrix indicator (PMI). As multiple-input multiple-output (MIMO) systems become more complicated, a UE may be able to provide a large amount of CSI. Systems and methods to improve efficiency in transmitting of CSI may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The method of transmitting channel state information (CSI) for wireless communication may include receiving a CSI configuration specifying a first set of configured frequency domain (FD) units to be reported. The method may include determining a first number of FD units based on the first set of configured FD units. The method may include selecting a second number of FD units that is greater than or equal to the first number of FD units. The method may include calculating, for one or more layers, a PMI for a second set of FD units including a number of FD units equal to the second number of FD units. The method may include allocating, according to a mapping rule, a number of PMIs for the first set of FD units to a subset of the PMIs for the second set of FD units. The method may include transmitting a CSI report including the PMIs for the second set of FD units.

In another aspect, a method of wireless communication may include receiving a first FD unit configuration indicating a precoding matrix indicator (PMI) granularity. The method may include receiving a second FD unit configuration indicating a first set of configured FD units for which to report channel state information (CSI). The method may include determining a first number of FD units based on the first FD unit configuration and the first set of configured FD units. The method may include selecting a second number of FD units that is greater than or equal to the first number of FD units. The method may include determining whether to transmit a CSI report based on whether the first number of FD units satisfies a first threshold value for configured FD units, or the second number of FD units satisfies a second threshold value for reported FD units, or the precoding matrix indicator granularity satisfies the FD unit threshold.

In another aspect, the disclosure provides an apparatus for transmitting CSI for wireless communication. The apparatus may include a memory, a transceiver, and a processor communicatively coupled to the memory and the transceiver. The processor may be configured to receive a CSI configuration specifying a first set of configured FD units to be reported. The processor may be configured to determine a first number of FD units based on the first set of configured FD units. The processor may be configured to select a second number of FD units that is greater than or equal to the first number of FD units. The processor may be configured to calculate, for one or more layers, a PMI for a second set of FD units including a number of FD units equal to the second number of FD units. The processor may be configured to allocate, according to a mapping rule, a number of PMIs for the first set of FD units to a subset of the PMIs for the second set of FD units. The processor may be configured to transmit a CSI report including the PMIs for the second set of FD units.

In another aspect, the disclosure provides an apparatus for transmitting CSI for wireless communication. The apparatus may include a memory, a transceiver, and a processor communicatively coupled to the memory and the transceiver. The processor may be configured to receive a first FD unit configuration indicating a PMI granularity. The processor may be configured to receive a second FD unit configuration indicating a first set of configured FD units for which to report CSI. The processor may be configured to determine a first number of FD units based on the first FD unit configuration and the first set of configured FD units. The processor may be configured to select a second number of FD units that is greater than or equal to the first number of FD units. The processor may be configured to determine whether to transmit a CSI report based on whether the first number of FD units satisfies a first threshold value for configured FD units, or the second number of FD units satisfies a second threshold value for reported FD units, or the precoding matrix indicator granularity satisfies the FD unit threshold.

In another aspect, the disclosure provides an apparatus for transmitting CSI for wireless communication. The apparatus may include means for receiving a CSI configuration specifying a first set of configured frequency domain (FD) units to be reported. The apparatus may include means for determining a first number of FD units based on the first set of configured FD units. The apparatus may include means for selecting a second number of FD units that is greater than or equal to the first number of FD units. The apparatus may include means for calculating, for one or more layers, a PMI for a second set of FD units including a number of FD units equal to the second number of FD units. The apparatus may include means for allocating, according to a mapping rule, a number of PMIs for the first set of FD units to a subset of the PMIs for the second set of FD units. The apparatus may include means for transmitting a CSI report including the PMIs for the second set of FD units.

In another aspect, the disclosure provides an apparatus for wireless communication. The apparatus may include means for receiving a first FD unit configuration indicating a PMI granularity. The apparatus may include means for receiving a second FD unit configuration indicating a first set of configured FD units for which to report CSI. The apparatus may include means for determining a first number of FD units based on the first FD unit configuration and the first set of configured FD units. The apparatus may include means for selecting a second number of FD units that is greater than or equal to the first number of FD units. The apparatus may include means for determining whether to transmit a CSI report based on whether the first number of FD units satisfies a first threshold value for configured FD units, or the second number of FD units satisfies a second threshold value for reported FD units, or the precoding matrix indicator granularity satisfies the FD unit threshold.

In another aspect, the disclosure provides a non-transitory computer-readable medium storing instructions executable by a processor. The computer-readable medium may include instructions to receive a CSI configuration specifying a first set of configured FD units to be reported. The computer-readable medium may include instructions to determine a first number of FD units based on the first set of configured FD units. The computer-readable medium may include instructions to select a second number of FD units that is greater than or equal to the first number of FD units. The computer-readable medium may include instructions to calculate, for one or more layers, a PMI for a second set of FD units including a number of FD units equal to the second number of FD units. The computer-readable medium may include instructions to allocate, according to a mapping rule, a number of PMIs for the first set of FD units to a subset of the PMIs for the second set of FD units. The computer-readable medium may include instructions to transmit a CSI report including the PMIs for the second set of FD units.

In another aspect, the disclosure provides a non-transitory computer-readable medium storing instructions executable by a processor. The computer-readable medium may include instructions to receive a first FD unit configuration indicating a PMI granularity. The computer-readable medium may include instructions to receive a second FD unit configuration indicating a first set of configured FD units for which to report CSI. The computer-readable medium may include instructions to determine a first number of FD units based on the first FD unit configuration and the first set of configured FD units. The computer-readable medium may include instructions to select a second number of FD units that is greater than or equal to the first number of FD units. The computer-readable medium may include instructions to determine whether to transmit a CSI report based on whether the first number of FD units satisfies a first threshold value for configured FD units, or the second number of FD units satisfies a second threshold value for reported FD units, or the precoding matrix indicator granularity satisfies the FD unit threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
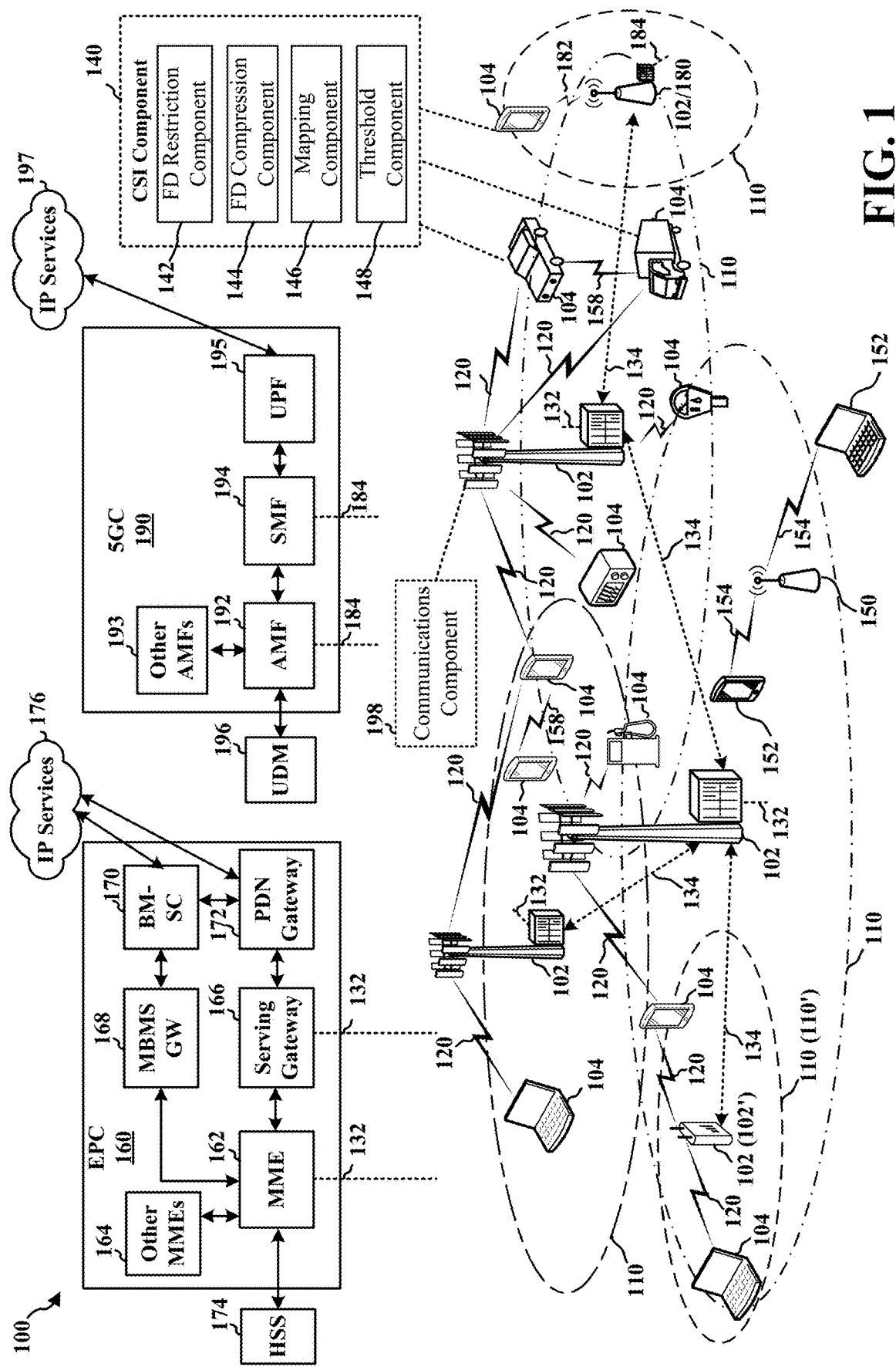
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The time and frequency resources that can be used by the UE to report channel state information (CSI) may be controlled by the network (e.g., a base station or gNB). CSI may include Channel Quality Indicator (CQI), precoding matrix indicator (PMI), CSI-RS resource indicator (CRI), SS/PBCH Block Resource indicator (SSBRI), layer indicator (LI), rank indicator (RI) and/or L1-RSRP. Existing CSI schemes (e.g., 3GPP 5G NR Release-15) may define PMI based on a multiple layers, multiple beams, and coefficients for frequency domain (FD) units. For example, a precoder for a layer, r, across $N_3$ FD units may be defined by the equation:

$$w_r = \sum_{i=0}^{2L-1} b_i \cdot c_i, \text{ where } c_i = \underline{[c_{i,0} \cdots c_{i,N_3-1}]}_{N_3}$$

where L is the number of beams, $b_i$ is the ith beam, $c_i$ is the coefficient matrix having a length of $N_3$. $N_3$ may correspond to a number of FD units such as, for example, sub-bands (SB), resource blocks, or groups of resource blocks. A UE may compute a precoder for each SB. The UE may find a PMI that matches the precoder best on each SB. In Release-15, number of frequency domain PMI is equal to the number of SB for which a PMI report is required. The network may indicate a reporting band identifying for which SB the UE should report a PMI. Based on the configuration of a bandwidth part (BWP) size and SB size, the network and UE may determine the total number of SBs in the configured BWP, the network may further send a configuration including a bit mask with a length equal to the number of SBs. For example, a value of "1" in the bit mask may indicate that the UE should report the PMI, and a value of "0" may indicate that the UE does not need to report the PMI. Accordingly, as the number of SB increases, the size of the coefficient matrix for reporting PMI may also increase. In order to reduce overhead of PMI, a new CSI codebook with frequency domain compression may be desirable.

In an aspect, frequency domain compression may be used to reduce the size of the coefficient matrix reported. For example, in this aspect, a precoder may be defined as:

$$w_r = \sum_{i=0}^{2L-1} b_i \cdot \tilde{c}_i \cdot F_i^H$$

where $F_i^H$ is a discrete Fourier transform (DFT) basis of size $M_i \times N_3$ and the coefficient matrix $\tilde{c}_i$ is of length $M_i$, where $M_i$ is a the number of basis selected for the ith beam, and equivalently it is also the number of coefficients associated with the ith beam. For some cases, UE performs a beam-common basis selection. That is, a same set of bases is selected for all beams, i.e., M_i=M for all i, and F_i=F for all i. for the ith beam. M may be configured via upper layer signaling with a common value for all beams. In some cases, the UE may perform beam specific basis selection, where $M_i < N_3$ bases are selected for a particular beam. Accordingly, frequency domain compression may reduce the size of the coefficient matrix from $c_i$ having length $N_3$ to $\tilde{c}_i$ having length $M_i$.

Frequency domain compression may pose several difficulties. First, defining $N_3$ based on a number of configured FD units may result in many possible values of $N_3$. Accordingly, a UE may need to store many different DFT bases (corresponding to each $N_3$ value) and switch among the different DFT bases according to the triggered CSI reporting. Additionally, some values of $N_3$ (e.g., prime numbers other than 2, 3, or 5, and their multiples) may be inefficient for computation of DFT bases. Second, non-contiguous selection of FD units to be reported may result in inefficient or inaccurate compression. Third, as a finer granularity for PMI may be adopted, the FD units may not correspond to a SB for which a CQI report is required. Instead, it may consist of X RBs and X can be equal to 1, 2, 4 or CQI SBSize/R. In this way, the value of total number of FD units may increase, which may lead to a large value of $N_3$.

In an aspect, the present disclosure provides an alternative and efficient PMI reporting technique. The value of $N_3$ may be selected to span a CSI reporting band. The value of $N_3$ may be selected from a set of defined values, which may be multiples of 2, 3, or 5, for efficient DFT bases. Additionally, limiting the potential values of $N_3$ may reduce the number of possible values of DFT sizes. For example, the number of FD units may be determined based on an ending index of a FD unit minus a starting index of an FD unit plus one, regardless of whether the FD units are contiguous. $N_3$ may be selected as the minimum value greater than or equal to the number of FD units. When $N_3$ is greater than the number of FD units, the UE may use a mapping rule to determine where to locate the FD units in the $N_3$ reported units.

In another aspect, some potential CSI configurations may be inefficient or the UE may not be capable of generating the requested CSI report in a timely manner. The present disclosure provides for the UE to be configured with one or more thresholds for restricting CSI configurations. The UE may provide the thresholds to the network as one or more UE capability indications. If the UE does receive a CSI configuration that satisfies the thresholds for exclusion, the UE may ignore the CSI configuration, drop the CSI report, send a previous CSI report, reduce the content of the CSI report, or fallback to a CSI report without frequency domain compression.

FIG. 1 is a diagram illustrating an example of a wireless communications system and an access network 100 including one or more UEs 104 configured to perform efficient CSI reporting using FD compression. The wireless communications system (also referred to as a wireless wide area network (WWAN)) includes base stations 102, the one or more UEs 104, an Evolved Packet Core (EPC) 160, and a 5G Core (5GC) 190. In certain aspects, the UE 104 may include a CSI component 140 configured to report PMI using FD compression and sub-band or FD unit restriction. In an aspect, for example, the CSI component 140 may include an FD restriction component 142 for determining a set of FD units for reporting, a FD compression component 144 for generating a compressed coefficient matrix, a mapping component 146 for mapping a PMI for a FD unit to a reported FD unit according to a mapping rule, and a threshold component 148 for using threshold values to determine whether the UE should report a CSI including PMI. Further details regarding the UE 104 executing the CSI component 140 are described below, particularly with regard to FIGS. 5-9.

The base stations 102 may include a communications component 198 for performing complementary operations with the CSI component 140. For example, the communications component 198 may receive CSI reports using FD compression and determine the reported FD unis based on the mapping rule. The communications component 198 may also receive UE capabilities from the UE 104 and transmit CSI configurations to the UE 104. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D include example frame structures and resources and/or channels that may be used for communication between the UEs 104 and the base stations 102 in network 100. The example frame structures and resources include resources (e.g., CSI-RS) for determining CSI and channels (e.g., PUCCH and PUSCH) for reporting CSI. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
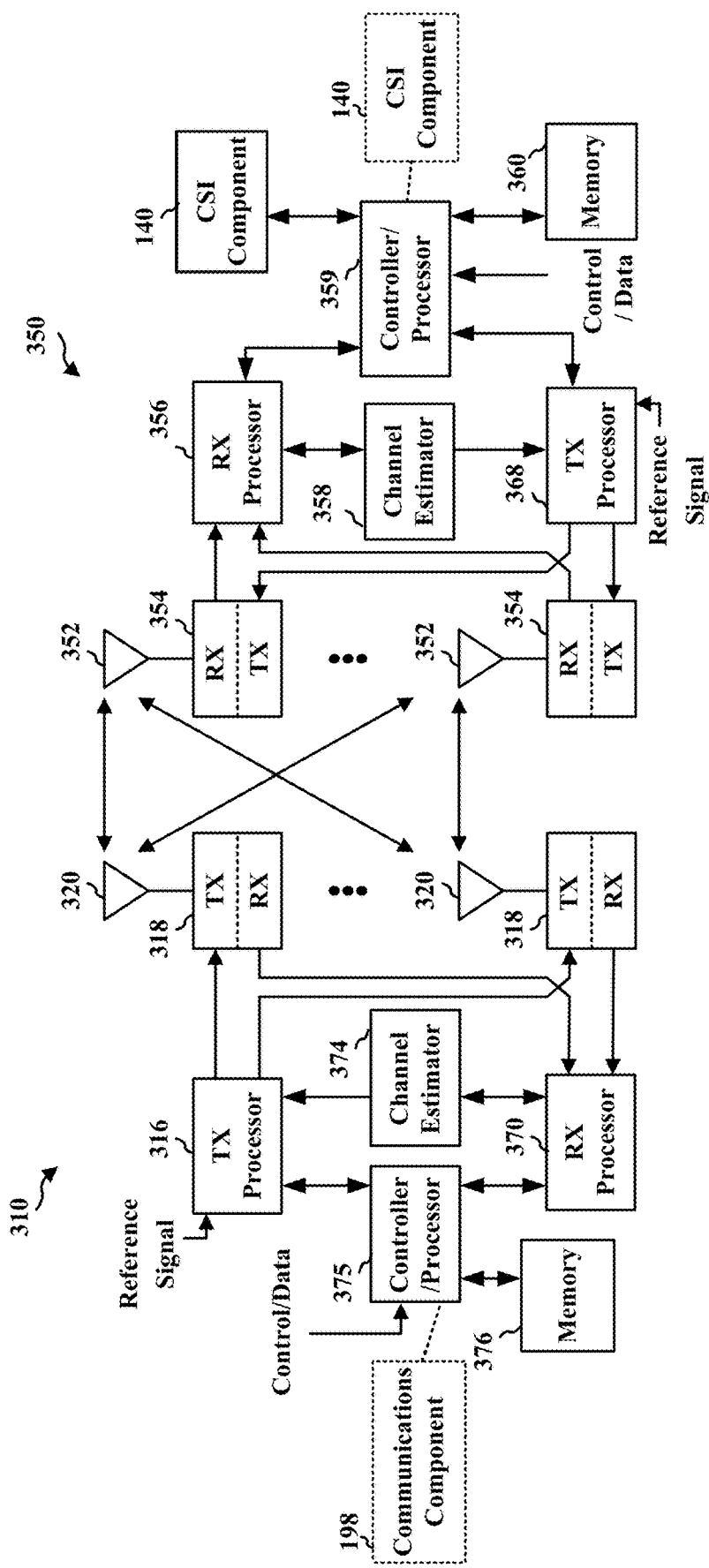
FIG. 3 is a diagram illustrating an example of a base station and user equipment (UE) in an access network.

FIG. 3 is a block diagram of a base station 310 in communication with a UE 350 in an access network, where base station 310 may be an example implementation of base station 102 and where UE 350 may be an example implementation of UE 104. Accordingly, the UE 350 may include a CSI component 140 for generating a CSI based on reference signals and reporting the CSI to the base station 310. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality. The CSI component 140 may also operate on received reference signals to generate a CSI report as described herein.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
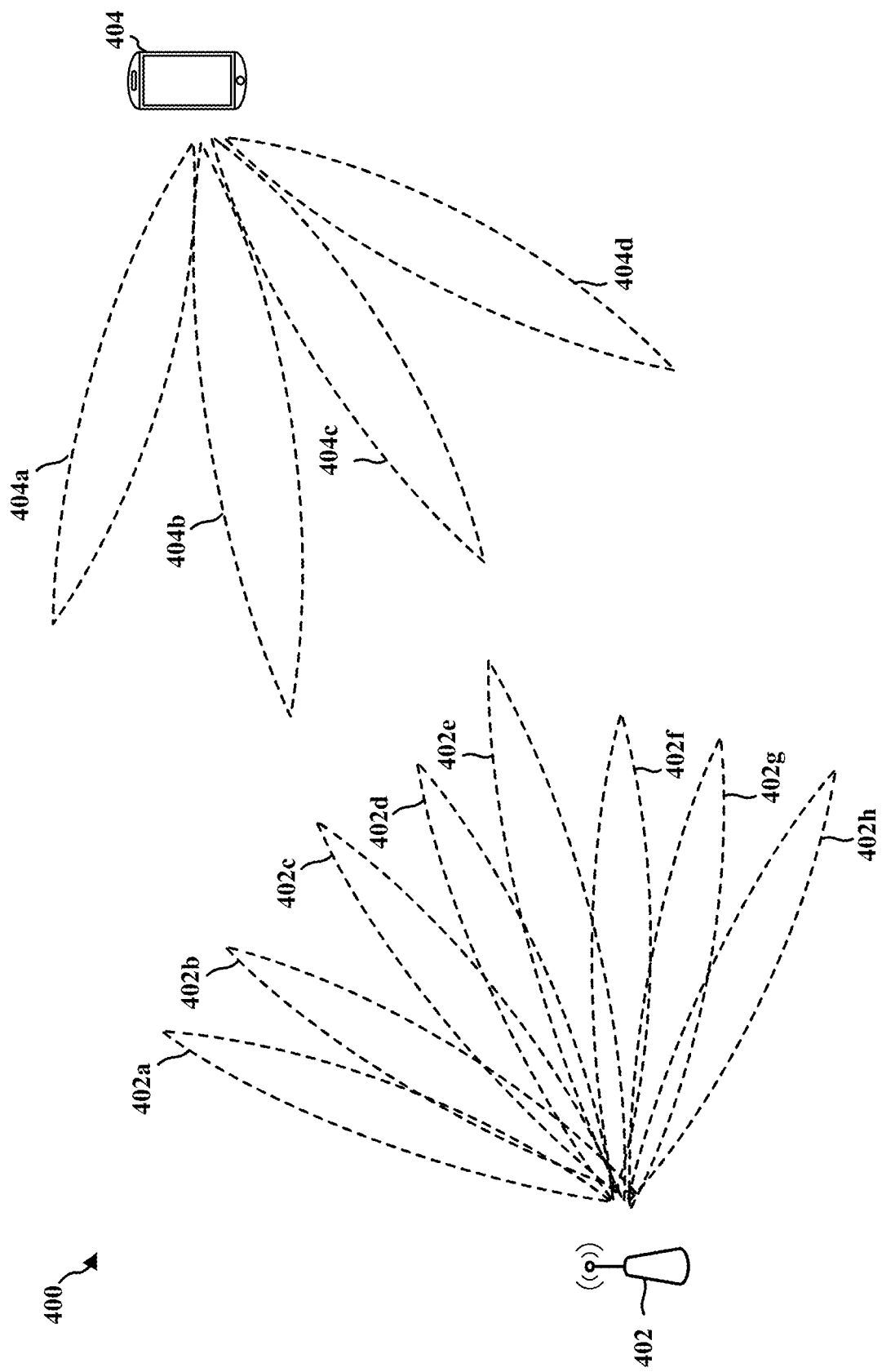
FIG. 4 is a diagram illustrating an example of a base station in communication with a UE using multiple beams.

FIG. 4 is a diagram 400 illustrating a base station 402 in communication with a UE 404 using beamforming, where base station 402 may be an example implementation of base station 102 and where UE 404 may be an example implementation of UE 104. In an aspect, the CSI reported by the UE 404 may include PMI for the base station 402 to select the correct beam. The base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Figure 5:
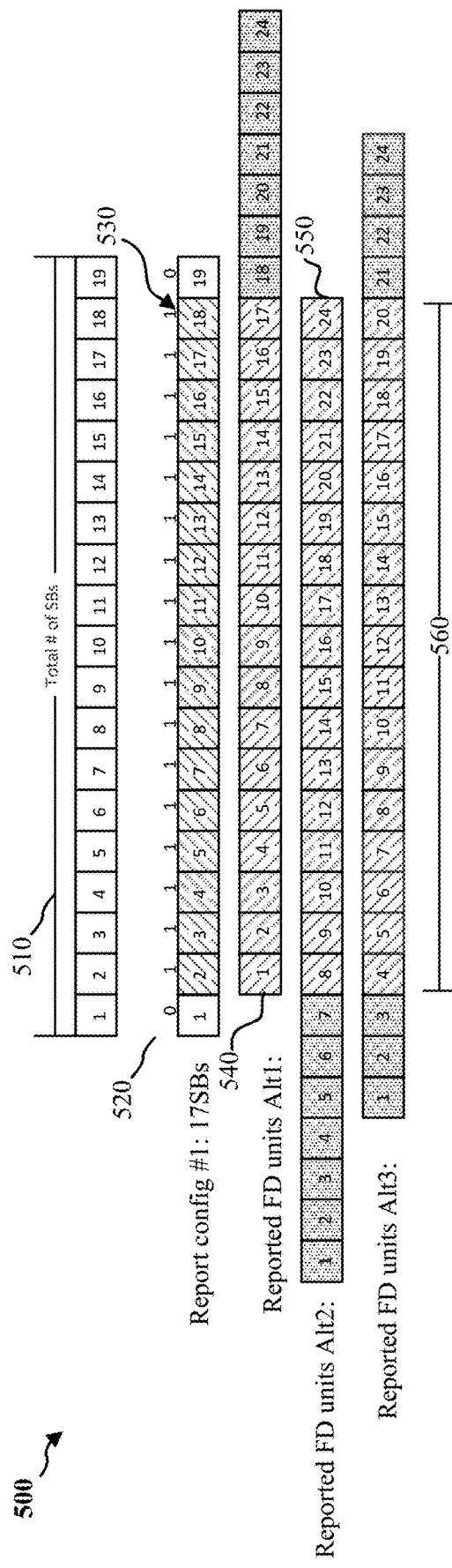
FIG. 5 is a diagram illustrating an example of mapping of contiguous FD units to reported coefficients.

Referring to FIG. 5, a diagram 500 illustrates example mappings of configured FD units to reported FD units for an example set of contiguous SBs. For example, the UE 104 may receive, from the base station 102, a CSI configuration including a bit mask 520 indicating that a set of configured FD units 530 includes 17 contiguous SBs that should be reported out of 19 configured SBs 510. The UE 104 via execution of the CSI component 140 and or FD restriction component 142 may determine an $N_3$ value of 24 FD units to span the indicated SBs. For example, 24 may be the minimum defined $N_3$ value greater than or equal to the number of SBs configured for reporting, e.g., greater than 17. In one example implementation, using a first mapping rule, the UE 104 via execution of the mapping component 146 may map the 17 PMIs corresponding to set of configured FD units 530 (i.e., the 17 contiguous SBs) to the first 17 reported FD units starting at the first reported FD unit 540. In another example implementation, using a second mapping rule, the UE 104 may map the 17 PMIs to the last 17 reported FD units ending at the last reported FD unit 550. In yet another example implementation, using a third mapping rule, the UE 104 may map the 17 PMIs to a middle 17 reported FD units 560. For Example, a number of units may be denoted $N_3^{rep}$=EndingFDindex−StartingFDindex, then the first configured FD unit corresponds to the $$\left(\left\lfloor \frac{N_3 - N_3^{rep}}{2} \right\rfloor + 1\right)\text{-}th$$

unit of the reported $N_3$ units.

Figure 6:
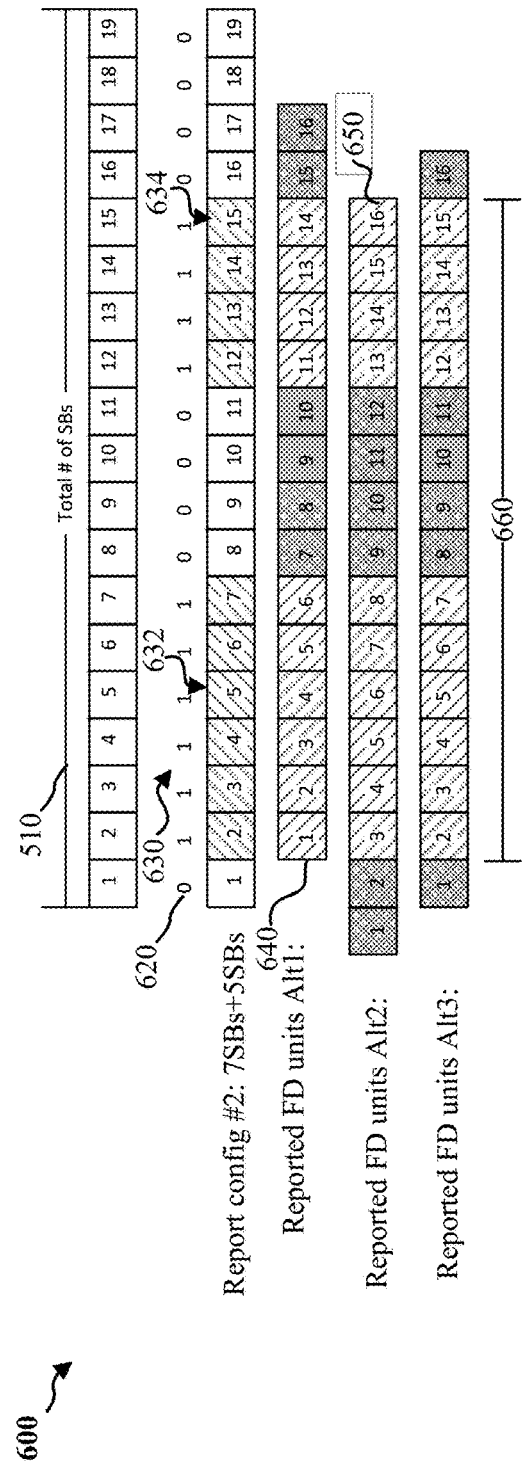
FIG. 6 is a diagram illustrating an example of mapping of non-contiguous FD units to reported coefficients.

Referring to FIG. 6, a diagram 600 illustrates example mappings of configured FD units to reported FD units for an example set of non-contiguous SBs. For example, the UE 104 may receive, from the base station 102, a CSI configuration including a bit mask 620 indicating set of configured FD units 630 to be reported, including a first subset 632 of 6 FD units and a second subset 634 of 4 FD units. Accordingly, there may be 10 SDs for reporting, but a number of FD units spanned by the set of configured FD units 630 indicated by bit mask 620, based on ending and starting indices (e.g., 15 minus 2 plus 1), may be 14. The UE 104 via execution of the CSI component 140 and/or FD restriction component 142 may select an $N_3$ value of 16 FD units from the defined $N_3$ values to span the indicated SBs. In one example implementation, using a first mapping rule, the UE 104 may map the 14 PMIs corresponding to the 14 FD units spanned by the set of configured FD units 630 to the first 14 reported FD units starting at the first reported FD unit 640. In another example implementation, using a second mapping rule, the UE 104 may map the 14 PMIs corresponding to the 14 FD units spanned by the set of configured FD units 630 to the last 14 reported FD units ending at the last reported FD unit 650. In yet another example implementation, using a third mapping rule, the UE 104 may map the 14 PMIs corresponding to the 14 FD units spanned by the set of configured FD units 630 to a middle 14 reported FD units 660.

In another aspect, the UE 104 may execute the FD restriction component 142 to decide the value of $N_3$ using FD unit restriction. The UE 104 via the FD restriction component 142 may define a threshold number of resource blocks, which may be dependent on at least a BWP size. The UE 104 may report the threshold number of resource blocks as a UE capability to the base station 102. The UE 104 may receive, from the base station 102, a first FD unit configuration for PMI granularity (e.g., X RBs, where X is a whole number). The UE 104 may receive, from the base station 102, a second configuration for determining the number of FD units requested by the base station 102. In an aspect, the UE 104 may understand a rule that it will not be configured with a PMI granularity less than the threshold number of resource blocks. If the PMI granularity of the first FD unit configuration is less than the threshold number of resource blocks, the UE may treat the first configuration as an invalid configuration and ignore or drop an associated CSI report. Alternatively, in this case, the UE 104 may not update the CSI information, for example, instead the UE may report a previous CSI report.

In another aspect, the UE 104 via the FD restriction component 142 may define a threshold number of FD units. The UE 104 may report the threshold number of FD units as a UE capability to the base station 102. Alternatively, the threshold number of FD units may be defined in a standards document, e.g., a 3GPP standard. The UE 104 may understand a rule that it will not be configured with a greater number of FD units than the threshold number of FD units. If a CSI configuration indicates a number of FD units greater than the threshold number of FD units, the UE 104 may treat the CSI configuration as an invalid configuration and ignore or drop the corresponding CSI report. Alternatively, the UE 104 may not update the CSI information, for example, and may instead transmit a previous CSI report. As another alternative, the UE 104 may report a CSI for the threshold number of FD units out of the number of configured FD units, using the threshold number of FD units to determine the $N_3$ value. The UE 104 may also define a second threshold defining a minimum number of FD units. The UE 104 may drop the CSI report or refrain from using FD compression if the configured number of FD units is less than the second threshold.

In another aspect, the UE 104 via the FD restriction component 142 may define a threshold value of $N_3$. The UE 104 may report the threshold value of $N_3$ as a UE capability to the base station 102. Alternatively, the threshold value of $N_3$ may be defined in a standards document, e.g., a 3GPP standard. The UE 104 may understand a rule that it will not be configured with a greater value of $N_3$ than the threshold value of $N_3$. If a CSI configuration (explicitly or implicitly) indicates a value of $N_3$ greater than the threshold value of $N_3$, the UE 104 may treat the CSI configuration as an invalid configuration and ignore or drop the corresponding CSI report. Alternatively, the UE 104 may not update the CSI information, for example, and instead may transmit a previous CSI report. As another alternative, the UE 104 may report a CSI for the maximum number of FD units that results in the $N_3$ value being equal to the threshold value of $N_3$.

In another aspect, a first configuration of PMI granularity may explicitly configure the number of RBs via higher-layer signaling (e.g., RRC configuration). For example, the UE 104 may receive higher-layer signaling that may indicate a factor R (e.g., 1, 2, or 4) indicating how many FD units are in each SB.

Figure 7:
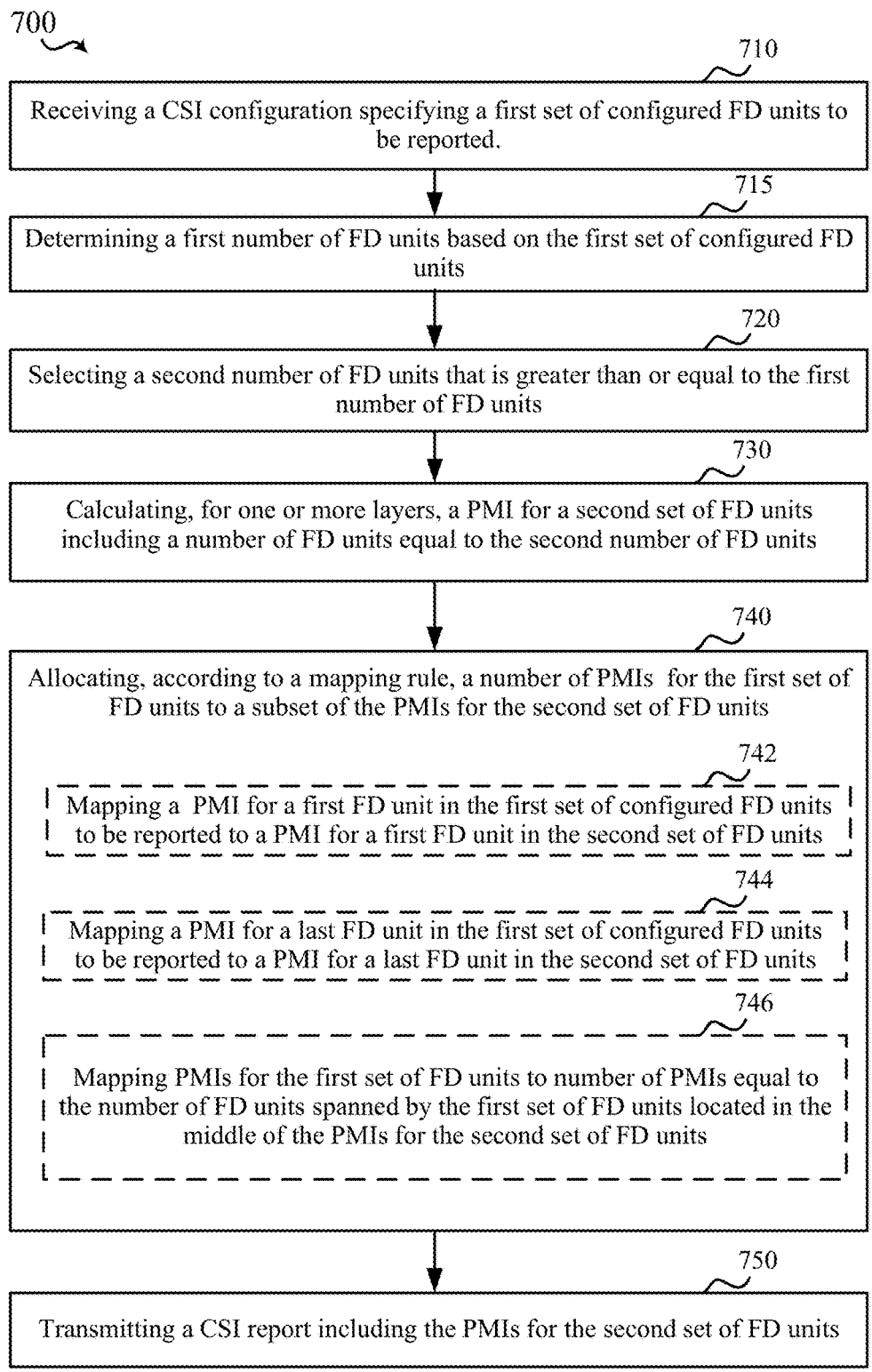
FIG. 7 is a flowchart of an example method of reporting CSI using FD compression.

For a second configuration of active FD units, the network (e.g., the base station 102) may transmit a SB mask similar to described above with respect to Release 15. The UE 104 may report PMI for each of the R FD units of each configured SB. The CQI for each configured SB may be computed using the PMIs on the associated R FD units. Alternatively, a different bit mask may have a size based on the total number of FD units in the BWP. There may be a link between the CQI SB mask and the PMI FD-unit mask. The CQI for each configured SB may be computed using all of the associated PMIs in the CQI SB. In an aspect, the number of FD units within each SB may be different. For example, if the total number of FD units is not evenly divisible by the number of SBs. For a CQI SB with no PMI FD unit, the UE may determine the configuration is invalid and drop the CSI, not update the CSI, or determine a default CQI or random CQI. For a PMI FD unit associated with no CQI SB, the UE may not report CQI, or the UE may not report PMI for that FD unit; and the UE may report a WB CQI considering the PMIs of all the FD units including the FD units associated with no CQI SB FIG. 7 illustrates a flow chart of an example of a method 700 for transmitting a CSI report utilizing FD compression. The method 700 may be performed by a UE (such as the UE 104, which may include the memory 360 and which may be the entire UE 104 or a component of the UE 104 such as the CSI component 140, TX processor 368, the RX processor 356, or the controller/processor 359). The method 700 may be performed by the CSI component 140 in communication with the communications component 198 of the base station 102.

In block 710, the method 700 may include receiving a CSI configuration specifying a first set of configured FD units to be reported. In an aspect, for example, the UE 104, the RX processor 356, or the controller/processor 359 may execute the CSI component 140 and/or the FD restriction component 142 to receive the CSI configuration specifying the first set of configured FD units to be reported. For instance, the first set of configured FD units may be a bit mask with a number of bits equal to a number of configured sub-bands or FD units in the bandwidth part. For example, as illustrated in FIGS. 5 and 6, there may be a maximum of 19 sub-bands in a bandwidth part. A value of "1" may indicate that the corresponding sub-band or FD unit is in the set of configured FD units to be reported. The bit mask may indicate a contiguous set or a non-contiguous set including multiple groups. Accordingly, the UE 104, RX processor 356 or the controller/processor 359 executing the CSI component 140 and/or the FD restriction component 142 may provide means for receiving a CSI configuration specifying a first set of configured FD units to be reported.

In block 715, the method 700 may include determining a first number of FD units based on the first set of configured FD units. In an aspect, for example, the UE 104, the RX processor 356, or the controller/processor 359 may execute the CSI component 140 and/or the FD restriction component 142 to determine the first number of FD units based on the first set of configured FD units. For example, the first number of FD units may be the number of FD units spanned by the first set of configured FD units to be reported. For example, the number of FD units spanned by the first set of configured FD units to be reported may be determined by subtracting the index of the first FD unit in the set from the index of the last FD unit in the set and adding one. Accordingly, the UE 104, RX processor 356 or the controller/processor 359 executing the CSI component 140 and/or the FD restriction component 142 may provide means for determining a first number of FD units based on the first set of configured FD units.

In block 720, the method 700 may include selecting a second number of FD units that is greater than or equal to the first number of FD units. In an aspect, for example, the UE 104, TX processor 368, the RX processor 356, or the controller/processor 359 may execute the CSI component 140 and/or the FD compression component 144 to select the second number of FD units that is greater than or equal to the first number of FD units. The second number of FD units may be used for frequency domain compression. For instance, the UE 104 may be configured with a set of defined frequency domain coefficient dimensions that may be used for efficient frequency domain compression. For example, the defined frequency domain coefficient dimensions may be multiples of 2, 3, or 5. In an aspect, for example, potential defined frequency domain coefficient dimensions may include 8, 12, 16, and 24 when the FD unit is a sub-band. Larger frequency domain coefficient dimensions may be used if smaller FD units are defined. The FD compression component 144 may select the minimum defined frequency domain coefficient dimension that is greater than or equal to the first number of FD units as the second number of FD units. Accordingly, the UE 104, TX processor 368, RX processor 356 or the controller/processor 359 executing the CSI component 140 and/or the FD compression component 144 may provide means for selecting a second number of FD units that is greater than or equal to the first number of FD units.

In block 730, the method 700 may include calculating, for one or more layers, a PMI for a second set of FD units including a number of FD units equal to the second number of FD units. In an aspect, for example, the UE 104, TX processor 368, the RX processor 356, or the controller/processor 359 may execute the CSI component 140 and/or the FD compression component 144 to calculate, for one or more layers, a PMI for a second set of FD units including a number of FD units equal to the second number of FD units. In an aspect, calculating the PMI may include determining a compressed coefficient matrix using the second number of FD units and a reduced basis as discrete Fourier transform bases. The compressed coefficient matrix may represent a PMI for a respective configured FD unit. For example, the FD compression component 144 may determine a precoder $w_r$ according to the following formula, $$w_r = \sum_{i=0}^{2L-1} b_i \cdot \tilde{c}_i \cdot F_i^H$$

where $F_i^H$ is the discrete Fourier transform bases of size $M_i \times N_3$, $\tilde{c}_i$ is the compressed coefficient matrix, $b_i$ is the ith beam, and L is the number of layers. $N_3$ may be set to the second number of FD units. In an aspect, the PMI may include at least one of a wideband spatial beam selection, a frequency domain compression basis selection wherein a dimension of the bases is equal to the second number of FD units, and a coefficient matrix associated with the beam and bases. Accordingly, the UE 104, TX processor 368, the RX processor 356, or the controller/processor 359 executing the CSI component 140 and/or the FD compression component 144 may provide means for calculating, for one or more layers, a PMI for a second set of FD units including a number of FD units equal to the second number of FD units.

In block 740, the method 700 may include allocating, according to a mapping rule, a number of PMIs for the first set of FD units to a subset of the PMIs for the second set of FD units. In an aspect, for example, the UE 104, TX processor 368, the RX processor 356, or the controller/processor 359 may execute the CSI component 140 and/or the mapping component 146 to allocate, according to a mapping rule, a number of PMIs for the first set of FD units to a subset of the PMIs for the second set of FD units. That is, using the above technique, the FD compression component 144 may generate a number of PMI equal to $N_3$, which may be greater than the number of configured FD units to be reported. To ensure that the base station 102 is able to determine which reported PMIs correspond to the requested FD units, the UE 104 may allocate the set of configured FD units to be reported among the $N_3$ reported FD units according to a configured mapping rule known to both the UE 104 and the base station 102. Accordingly, the UE 104, TX processor 368, the RX processor 356, or the controller/processor 359 executing the CSI component 140 and/or the mapping component 146 may provide means for allocating, according to a mapping rule, a number of PMIs for the first set of FD units to a subset of the PMIs for the second set of FD units.

For example, in sub-block 742, the block 740 may include mapping a PMI for a first FD unit in the first set of configured FD units to be reported to a PMI for a first FD unit in the second set of FD units. In an aspect, for example, the CSI component 140 may execute the mapping component 146 to map the PMI for the first FD unit in the first set of configured FD units to be reported to the PMI for the first FD unit in the second set of FD units. For instance, as illustrated in FIG. 5, the first configured FD unit is allocated to the first reported PMI in the first reported FD unit 640. Similarly, as illustrated in FIG. 6, the first configured FD unit is allocated to the first reported PMI for the first reported FD unit 640. The other configured FD unit in the set of configured FD units to be reported may be mapped sequentially from the first reported FD unit 640.

As another example, in sub-block 744, the block 740 may include a PMI for a last FD unit in the first set of configured FD units to be reported to a PMI for a last FD unit in the second set of FD units PMI. In an aspect, for example, the CSI component 140 may execute the mapping component 146 to map the PMI for a last FD unit in the first set of configured FD units 530, 630 to a PMI for a last FD unit 550, 650 in the second set of FD units. The other configured FD units in the first set of configured FD units 530, 630 may be mapped in reverse sequence from the last reported FD unit 550, 650.

As a third example, in sub-block 746, the block 740 may include mapping PMIs for the first set of FD units to number of PMIs equal to the number of FD units spanned by the first set of FD units located in the middle of the PMIs for the second set of FD units. In an aspect, for example, the CSI component 140 may execute the mapping component 146 to map PMIs for the first set of FD units 530 to number of PMIs equal to the number of FD units spanned by the first set of FD units located in the middle of the PMIs for the second set of FD units 560, 660.

In block 750, the method 700 may include transmitting a CSI report including the PMIs for the second set of FD units. In an aspect, for example, the UE 104, TX processor 368, or the controller/processor 359 may execute the CSI component 140 to transmit the CSI report including the PMIs for the second set of FD units. Accordingly, the UE 104, TX processor 368 or the controller/processor 359 executing the CSI component 140 may provide means for transmitting a CSI report including the PMIs for the second set of FD units.

Figure 8:
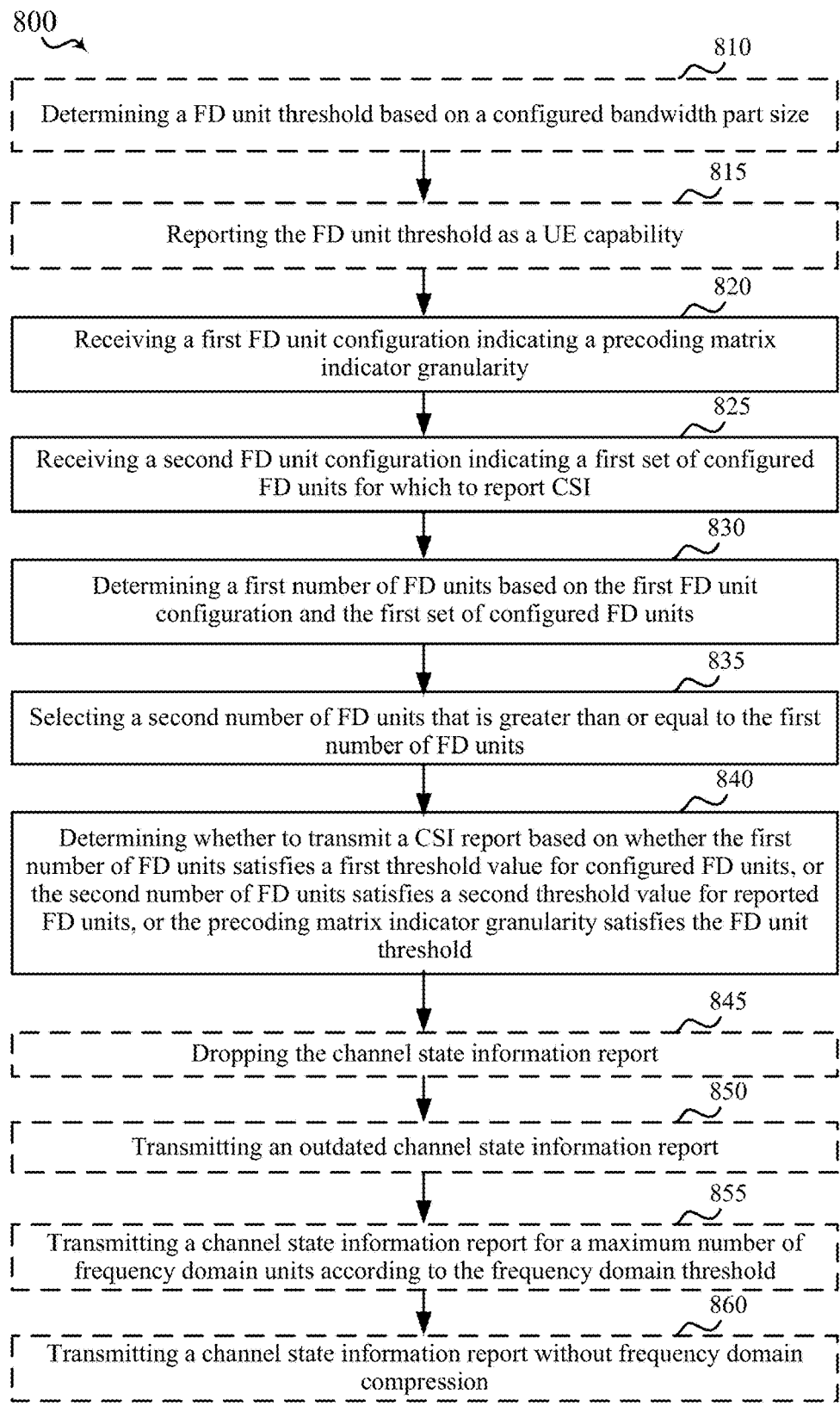
FIG. 8 is a flowchart of an example method of reporting CSI using thresholds to restrict an FD unit configuration.

FIG. 8 illustrates a flow chart of an example of a method 800 for transmitting a CSI report utilizing FD compression. The method 800 may be performed by a UE (such as the UE 104, which may include the memory 360 and which may be the entire UE 104 or a component of the UE 104 such as the CSI component 140, TX processor 368, the RX processor 356, or the controller/processor 359). The method 700 may be performed by the CSI component 140 in communication with the communications component 198 of the base station 102. The method 800 may be performed in conjunction with the method 700.

In block 810, the method 800 may optionally include determining a FD unit threshold based on a configured bandwidth part size. In an aspect, for example, the UE 104, TX processor 368, the RX processor 356, or the controller/processor 359 may execute the CSI component 140 and/or the threshold component 148 to determine the FD unit threshold based on the configured bandwidth part size. For instance, the FD unit threshold may be a minimum number of resource blocks for a precoding matrix indicator granularity, a maximum number of FD units for which to report channel state information, a minimum number of FD units for which to report channel state information, a maximum frequency domain dimension for frequency domain compression (e.g., a maximum $N_3$ value). The threshold component 148 may be configured with one or more FD unit thresholds and/or rules, tables, or formulas for determining the one or more FD unit thresholds based on the BWP size. Accordingly, the UE 104, TX processor 368, the RX processor 356, or the controller/processor 359 executing the CSI component 140 and/or the threshold component 148 may provide means for determining a FD unit threshold based on a configured bandwidth part size.

In block 815, the method 800 may optionally include reporting the FD unit threshold as a UE capability. In an aspect, for example, the UE 104, TX processor 368, or the controller/processor 359 may execute the CSI component 140 and/or the threshold component 148 to report the FD unit threshold as a UE capability (e.g., using RRC signaling). For example, an information element may be defined for one or more FD unit thresholds and the threshold component 148 may report each applicable FD unit threshold. Accordingly, the UE 104, TX processor 368, or the controller/processor 359 executing the CSI component 140 and/or the threshold component 148 may provide means reporting the FD unit threshold as a UE capability.

In block 820, the method 800 may include receiving a first frequency domain unit configuration indicating a precoding matrix indicator granularity. In an aspect, for example, the UE 104, the RX processor 356, or the controller/processor 359 may execute the CSI component 140 and/or the FD restriction component 142 to receive the first frequency domain unit configuration indicating the precoding matrix indicator granularity. The first frequency domain unit configuration may be, for example, included in a CSI configuration or in higher layer signaling (e.g., RRC configuration). Accordingly, the UE 104, RX processor 356 or the controller/processor 359 executing the CSI component 140 and/or the FD restriction component 142 may provide means for receiving a first frequency domain unit configuration indicating a precoding matrix indicator granularity.

In block 825, the method 800 may include receiving a second FD unit configuration indicating a first set of configured FD units for which to report CSI. In an aspect, for example, the UE 104, the RX processor 356, or the controller/processor 359 may execute the CSI component 140 and/or the FD restriction component 142 to receive the second FD unit configuration indicating the first set of configured FD units for which to report CSI. For instance, the second FD unit configuration may be the bit mask 520, 620. As discussed above, the bit mask 520, 620 may be on a per sub-band or per FD unit basis. The FD restriction component 142 may determine FD units corresponding to the indicated sub-bands if a per sub-band bit mask is used. In an aspect, receiving the second FD unit configuration may include receiving a value indicating a number of FD units per sub-band. The FD restriction component 142 may determine the first number of FD units based on a multiplication of the number of sub-bands and the value. The CSI component 140 may compute the CQI for a sub-band using all of the FD units associated with the sub-band. In another aspect, receiving the second FD unit configuration indicating the first set of configured FD units for which to report CSI may include receiving a configuration of a set of FD units as a bitmap, wherein the length of the bitmap is equal to the total number of FD units, a "1" value in the bitmap indicates the first set of configured FD units, and wherein a channel quality indicator for a sub-band is computed using all of the FD units associated with the sub-band. If a sub-band is associated with no FD units, the CSI component 140 may drop the CSI report, report an outdated CSI, or report out of range for the sub-band. If an FD unit is associated with no sub-band for CQI, the CSI component 140 may report no CQI value for the FD unit or report no PMI for the FD unit. Accordingly, the UE 104, RX processor 356, or the controller/processor 359 executing the CSI component 140 and/or the FD restriction component 142 may provide means for receiving a second FD unit configuration indicating a first set of configured FD units for which to report CSI.

In block 830, the method 800 may include determining a first number of FD units based on the first FD unit configuration and the first set of configured FD units. In an aspect, for example, the UE 104, TX processor 368, the RX processor 356, or the controller/processor 359 may execute the CSI component 140 and/or the FD restriction component 142 to determine the first number of FD units based on the first FD unit configuration and the first set of configured FD units. For example, the first number of FD units may be the number of FD units spanned by the first set of configured FD units to be reported. For example, the number of FD units spanned by the first set of configured FD units to be reported may be determined by subtracting the index of the first FD unit in the set from the index of the last FD unit in the set and adding one. Accordingly, the UE 104, TX processor 368, the RX processor 356, or the controller/processor 359 executing the CSI component 140 and/or the FD restriction component 142 may provide means for determining a first number of FD units based on the first FD unit configuration and the first set of configured FD units.

In block 835, the method 800 may include selecting a second number of FD units that is greater than or equal to the first number of FD units. In an aspect, for example, the UE 104, TX processor 368, the RX processor 356, or the controller/processor 359 may execute the CSI component 140 and/or the FD compression component 144 to select the second number of FD units that is greater than or equal to the first number of FD units. The second number of FD units may be used for frequency domain compression. For instance, the UE 104 may be configured with a set of defined frequency domain coefficient dimensions that may be used for efficient frequency domain compression. For example, the defined frequency domain coefficient dimensions may be multiples of 2, 3, or 5. In an aspect, for example, potential defined frequency domain coefficient dimensions may include 8, 12, 16, and 24 when the FD unit is a sub-band. Larger frequency domain coefficient dimensions may be used if smaller FD units are defined. The FD compression component 144 may select the minimum defined frequency domain coefficient dimension that is greater than or equal to the first number of FD units as the second number of FD units. Accordingly, the UE 104, TX processor 368, the RX processor 356, or the controller/processor 359 executing the CSI component 140 and/or the FD compression component 144 may provide means for selecting a second number of FD units that is greater than or equal to the first number of FD units.

In block 840, the method 800 may include determining whether to transmit a CSI report based on whether the first number of FD units satisfies a first threshold value for configured FD units, or the second number of FD units satisfies a second threshold value for reported FD units, or the precoding matrix indicator granularity satisfies the FD unit threshold. In an aspect, for example, the UE 104, TX processor 368, or the controller/processor 359 may execute the CSI component 140 and/or the threshold component 148 to determine whether to transmit a CSI report based on whether the first number of FD units satisfies a first threshold value for configured FD units, or the second number of FD units satisfies a second threshold value for reported FD units, or the precoding matrix indicator granularity satisfies the FD unit threshold. For instance, the threshold component 148 may compare the FD unit threshold to either of the first FD configuration or the second FD configuration to determine whether to report CSI using FD compression for the received FD configuration. That is, the thresholds may restrict the FD configurations where the UE 104 may use FD compression. Accordingly, the UE 104 may avoid reporting CSI using FD compression where doing so would be inefficient. In view of the foregoing, the UE 104, TX processor 368 or the controller/processor 359 executing the CSI component 140 and/or the threshold component 148 may provide means for determining whether to transmit a CSI report.

In block 845, the method 800 may optionally include dropping the channel state information report. In an aspect, for example, the UE 104, TX processor 368, or the controller/processor 359 may execute the CSI component 140 and/or the threshold component 148 to drop the channel state information report in response to one of the first FD configuration or the second FD configuration satisfying the FD unit threshold. For example, the threshold component 148 may drop the channel state information report in response to the received precoding matrix indicator granularity being less than the minimum number of resource blocks, in response to the first number of FD units being greater than a maximum number of FD units, or in response to the second number of FD units being greater than a maximum number of reported FD units. Accordingly, the UE 104, TX processor 368, or the controller/processor 359 executing the CSI component 140 and/or the threshold component 148 may provide means for dropping the channel state information report.

In block 850, the method 800 may optionally include transmitting an outdated channel state information report. In an aspect, for example, the UE 104, TX processor 368, or the controller/processor 359 may execute the CSI component 140 and/or the threshold component 148 to transmit a previous channel state information report in response to one of the first FD configuration or the second FD configuration satisfying the FD unit threshold. An outdated channel state report may be a CSI report that is not updated. For example, an outdated CSI report may be a previous CSI report, or a CSI report including meaningless information. In an aspect, the threshold component 148 may transmit an outdated channel state information report in response to the received precoding matrix indicator granularity being less than the minimum number of resource blocks, in response to the first number of FD units being greater than a maximum number of FD units, or in response to the second number of FD units being greater than a maximum number of reported FD units. Accordingly, the UE 104, TX processor 368, or the controller/processor 359 executing the CSI component 140 and/or the threshold component 148 may provide means for transmitting an outdated channel state information report.

In block 855, the method 800 may optionally include transmitting a channel state information report for a maximum number of frequency domain units according to the FD unit threshold. In an aspect, for example, the UE 104, TX processor 368, or the controller/processor 359 may execute the CSI component 140 and/or the threshold component 148 to transmit a channel state information report for a maximum number of frequency domain units according to the FD unit threshold in response to the second FD unit configuration satisfying the FD unit threshold. For example, the threshold component 148 may transmit a previous channel state information report in response to the first number of FD units being greater than a maximum number of FD units, or in response to the second number of FD units being greater than a maximum number of reported FD units. Accordingly, the UE 104, TX processor 368, or the controller/processor 359 executing the CSI component 140 and/or the threshold component 148 may provide means for transmitting a channel state information report for a maximum number of frequency domain units according to the FD unit threshold.

In block 860, the method 800 may optionally include transmitting a channel state information report without frequency domain compression. In an aspect, for example, the UE 104, TX processor 368, or the controller/processor 359 may execute the CSI component 140 and/or the threshold component 148 to transmit the channel state information report without frequency domain compression in response to the first number of FD units being less than the minimum number of FD units. The threshold component 148 may fall back to a release 15 CSI report without FD compression because the FD compression may not reduce the size of the CSI report for a small number of FD units. Accordingly, the UE 104, TX processor 368, or the controller/processor 359 executing the CSI component 140 and/or the threshold component 148 may provide means for transmitting a channel state information report without frequency domain compression.

Figure 9:
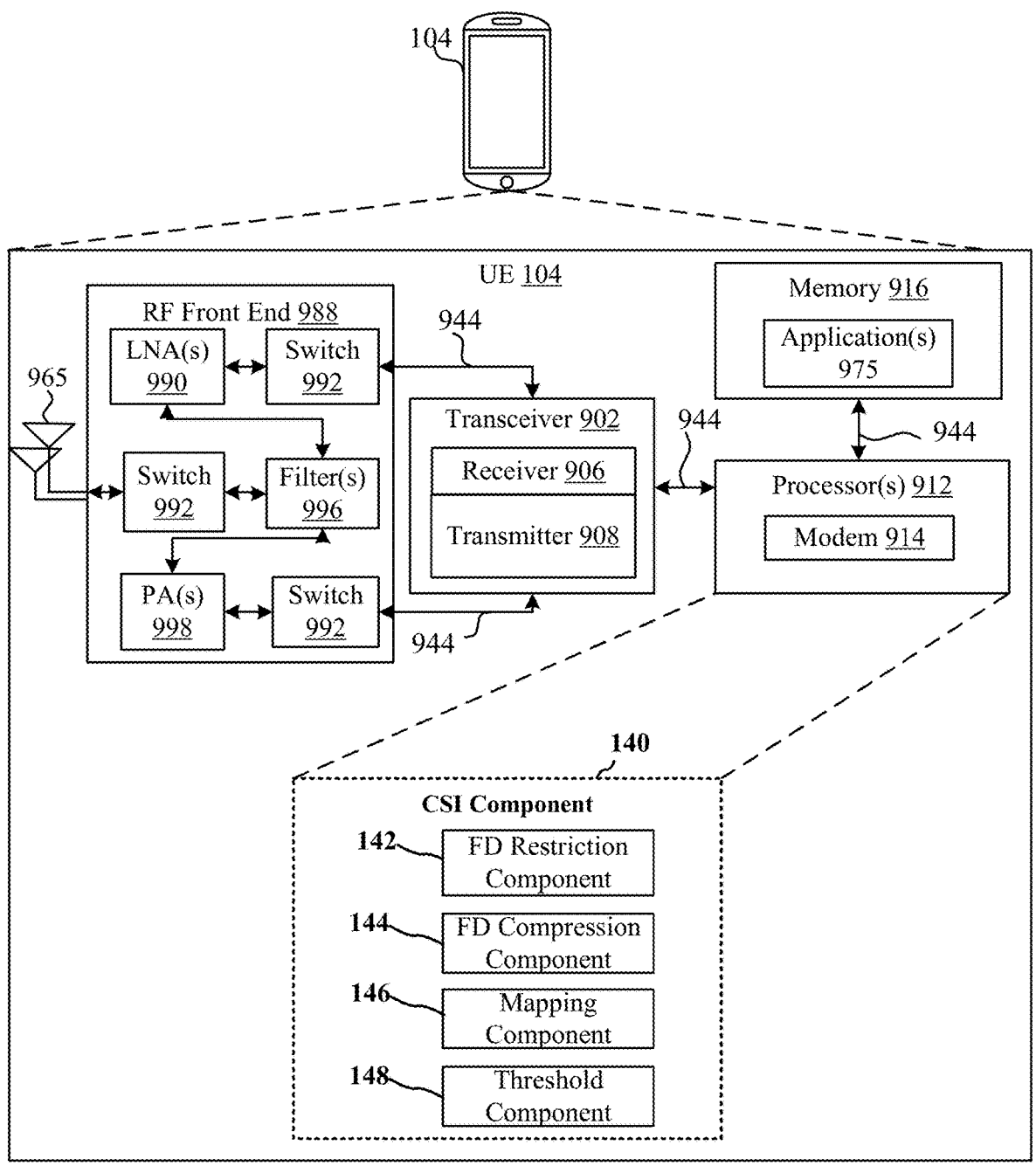
FIG. 9 is a diagram of example components of the UE of FIG. 1.

Referring to FIG. 9, one example of an implementation of UE 104 may include a variety of components, some of which have already been described above, but including components such as one or more processors 912 and memory 916 and transceiver 902 in communication via one or more buses 944, which may operate in conjunction with modem 914, and CSI component 140 to enable one or more of the functions described herein related to activation of multiple SPS configurations and receiving PDSCH according to one the multiple SPS configurations. Further, the one or more processors 912, modem 914, memory 916, transceiver 902, RF front end 988 and one or more antennas 965 may be configured to support voice and/or data calls (simultaneously or non-simultaneously) in one or more radio access technologies.

In an aspect, the one or more processors 912 may include a modem 914 that uses one or more modem processors. The various functions related to CSI component 140 may be included in modem 914 and/or processors 912 and, in an aspect, may be executed by a single processor, while in other aspects, different ones of the functions may be executed by a combination of two or more different processors. For example, in an aspect, the one or more processors 912 may include any one or any combination of a modem processor, or a baseband processor, or a digital signal processor, or a transmit processor, or a receiver processor, or a transceiver processor associated with transceiver 902. In other aspects, some of the features of the one or more processors 912 and/or modem 914 associated with CSI component 140 may be performed by transceiver 902.

Also, memory 916 may be configured to store data used herein and/or local versions of applications 975, CSI component 140 and/or one or more of subcomponents thereof being executed by at least one processor 912. Memory 916 may include any type of computer-readable medium usable by a computer or at least one processor 912, such as random access memory (RAM), read only memory (ROM), tapes, magnetic discs, optical discs, volatile memory, non-volatile memory, and any combination thereof. In an aspect, for example, memory 916 may be a non-transitory computer-readable storage medium that stores one or more computer-executable codes defining CSI component 140 and/or one or more of subcomponents thereof, and/or data associated therewith, when UE 104 is operating at least one processor 912 to execute CSI component 140 and/or one or more subcomponents thereof.

Transceiver 902 may include at least one receiver 906 and at least one transmitter 908. Receiver 906 may include hardware, firmware, and/or software code executable by a processor for receiving data, the code comprising instructions and being stored in a memory (e.g., computer-readable medium). Receiver 906 may be, for example, a radio frequency (RF) receiver. In an aspect, receiver 906 may receive signals transmitted by at least one base station 102. Additionally, receiver 906 may process such received signals, and also may obtain measurements of the signals, such as, but not limited to, Ec/Io, SNR, RSRP, RSSI, etc. Transmitter 908 may include hardware, firmware, and/or software code executable by a processor for transmitting data, the code comprising instructions and being stored in a memory (e.g., computer-readable medium). A suitable example of transmitter 908 may including, but is not limited to, an RF transmitter.

Moreover, in an aspect, UE 104 may include RF front end 988, which may operate in communication with one or more antennas 965 and transceiver 902 for receiving and transmitting radio transmissions, for example, wireless communications transmitted by at least one base station 102 or wireless transmissions transmitted by UE 104. RF front end 988 may be connected to one or more antennas 965 and may include one or more low-noise amplifiers (LNAs) 990, one or more switches 992, one or more power amplifiers (PAs) 998, and one or more filters 996 for transmitting and receiving RF signals.

In an aspect, LNA 990 may amplify a received signal at a desired output level. In an aspect, each LNA 990 may have a specified minimum and maximum gain values. In an aspect, RF front end 988 may use one or more switches 992 to select a particular LNA 990 and its specified gain value based on a desired gain value for a particular application.

Further, for example, one or more PA(s) 998 may be used by RF front end 988 to amplify a signal for an RF output at a desired output power level. In an aspect, each PA 998 may have specified minimum and maximum gain values. In an aspect, RF front end 988 may use one or more switches 992 to select a particular PA 998 and its specified gain value based on a desired gain value for a particular application.

Also, for example, one or more filters 996 may be used by RF front end 988 to filter a received signal to obtain an input RF signal. Similarly, in an aspect, for example, a respective filter 996 may be used to filter an output from a respective PA 998 to produce an output signal for transmission. In an aspect, each filter 996 may be connected to a specific LNA 990 and/or PA 998. In an aspect, RF front end 988 may use one or more switches 992 to select a transmit or receive path using a specified filter 996, LNA 990, and/or PA 998, based on a configuration as specified by transceiver 902 and/or processor 912.

As such, transceiver 902 may be configured to transmit and receive wireless signals through one or more antennas 965 via RF front end 988. In an aspect, transceiver 902 may be tuned to operate at specified frequencies such that UE 104 can communicate with, for example, one or more base stations 102 or one or more cells associated with one or more base stations 102. In an aspect, for example, modem 914 may configure transceiver 902 to operate at a specified frequency and power level based on the UE configuration of the UE 104 and the communication protocol used by modem 914.

In an aspect, modem 914 may be a multiband-multimode modem, which can process digital data and communicate with transceiver 902 such that the digital data is sent and received using transceiver 902. In an aspect, modem 914 may be multiband and be configured to support multiple frequency bands for a specific communications protocol. In an aspect, modem 914 may be multimode and be configured to support multiple operating networks and communications protocols. In an aspect, modem 914 may control one or more components of UE 104 (e.g., RF front end 988, transceiver 902) to enable transmission and/or reception of signals from the network based on a specified modem configuration. In an aspect, the modem configuration may be based on the mode of the modem and the frequency band in use. In another aspect, the modem configuration may be based on UE configuration information associated with UE 104 as provided by the network during cell selection and/or cell reselection.

Figure 10:
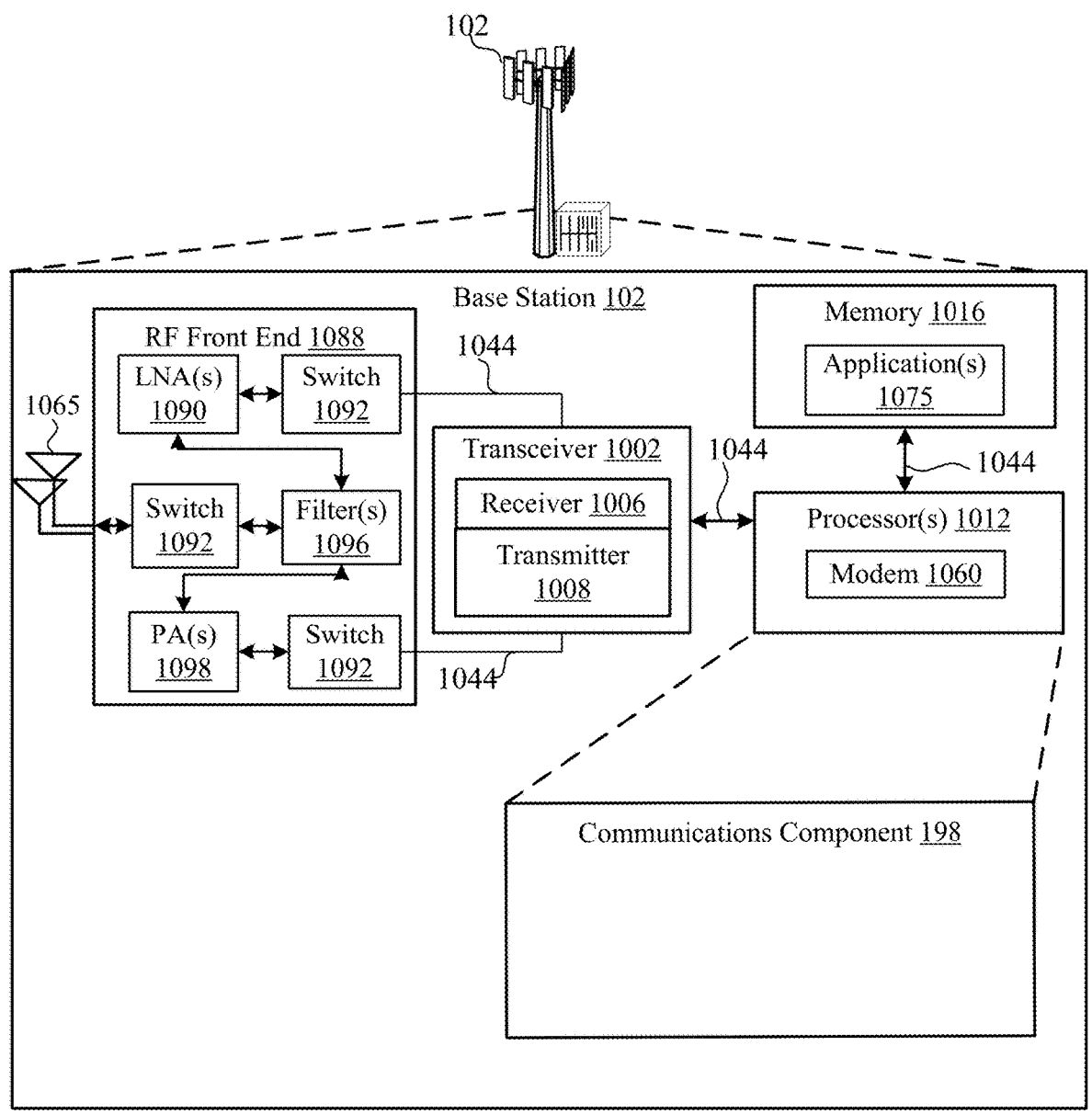
FIG. 10 is a diagram of example components of the base station of FIG. 1.

Referring to FIG. 10, one example of an implementation of a base station 102 may include a variety of components, some of which have already been described above, but including components such as one or more processors 1012 and memory 1016 and transceiver 1002 in communication via one or more buses 1044, which may operate in conjunction with modem 160 and communications component 198 to enable one or more of the functions described herein related to CSI reporting using FD compression.

The transceiver 1002, receiver 1006, transmitter 1008, one or more processors 1012, memory 1016, applications 1075, buses 1044, RF front end 1088, LNAs 1090, switches 1092, filters 1096, PAs 1098, and one or more antennas 1065 may be the same as or similar to the corresponding components of UE 104, as described above, but configured or otherwise programmed for base station operations as opposed to UE operations.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of transmitting channel state information (CSI) for wireless communication, comprising:
    receiving a CSI configuration specifying a first set of configured frequency domain (FD) units to be reported;
    determining a first number of FD units based on the first set of configured FD units;
    selecting a second number of FD units that is greater than or equal to the first number of FD units;
    calculating, for one or more layers, a precoding matrix indicator (PMI) for a second set of FD units including a number of FD units equal to the second number of FD units;
    allocating, according to a mapping rule, a number of PMIs for the first set of FD units to a subset of the PMIs for the second set of FD units; and
    transmitting a CSI report including the PMIs for the second set of FD units.

2. The method of claim 1, wherein the mapping rule maps a PMI for a first FD unit in the first set of configured FD units to be reported to a PMI for a first FD unit in the second set of FD units.

3. The method of claim 1, wherein the mapping rule maps a PMI for a last FD unit in the first set of configured FD units to be reported to a PMI for a last FD unit in the second set of FD units.

4. The method of claim 1, wherein the mapping rule maps PMIs for the first set of FD units to a middle of the PMIs for the second set of FD units.

5. The method of claim 1, wherein the PMI includes at least one of a wideband spatial beam selection, a frequency domain compression basis selection wherein a dimension of the bases is equal to the second number of FD units, and a coefficient matrix associated with the beam and bases.

6. The method of claim 1, wherein the second number of FD units is selected from a set of defined values that are multiples of at least one of 2, 3, or 5.

7. The method of claim 1, wherein determining the first number of FD units includes subtracting an index of a first FD unit from an index of a last FD unit and adding one.

8. The method of claim 1, wherein the first set of FD units is non-contiguous and the second number of FD units is greater than or equal to an index of a last FD unit minus an index of a first FD unit plus one.

9. The method of claim 1, further comprising:
    receiving a FD unit configuration indicating a PMI granularity;

determining the first number of FD units based on the FD unit configuration and the first set of configured FD units to be reported;

determining the second number of FD units based on the first number of FD units; and determining whether to transmit the CSI report based on whether the first number of FD units satisfies a first threshold value for configured FD units, or the second number of FD units satisfies a second threshold value for reported FD units, or the PMI granularity satisfies the FD unit threshold.

10. A method of wireless communication, comprising:

receiving a first FD unit configuration indicating a precoding matrix indicator (PMI) granularity;

receiving a second FD unit configuration indicating a first set of configured FD units for which to report channel state information (CSI);

determining a first number of FD units based on the first FD unit configuration and the first set of configured FD units;

selecting a second number of FD units that is greater than or equal to the first number of FD units; and determining whether to transmit a CSI report based on whether the first number of FD units satisfies a first threshold value for configured FD units, or the second number of FD units satisfies a second threshold value for reported FD units, or the PMI granularity satisfies the FD unit threshold.

11. The method of claim 10, wherein at least one of the FD unit threshold, the first threshold value of configured FD units, or the second threshold value for reported FD units is configured by a base station.

12. The method of claim 10, wherein the FD unit threshold is a minimum number of resource blocks (RBs) for the PMI granularity.

13. The method of claim 12, wherein the FD unit threshold is based on a UE reported capability of a minimum number of RBs for PMI granularity.

14. The method of claim 12, further comprising dropping the CSI report in response to at least one of:

determining that the first FD unit configuration indicates a PMI granularity less than the minimum number of resource blocks; or determining that the first FD unit configuration indicates a PMI granularity less than the minimum number of resource blocks.

15. The method of claim 10, wherein the first threshold value for configured FD units is a maximum number of FD units for which to calculate CSI, wherein the CSI comprises at least PMI, the method further comprising reporting the maximum number of FD units for which to calculate CSI as a UE capability.

16. The method of claim 15, further comprising dropping the CSI report in response to determining that the first number of FD units is greater than the maximum number of FD units.

17. The method of claim 16, further comprising transmitting an outdated CSI report in response to at least one of:

determining that the first number of FD units is greater than the maximum number of FD units; or determining that the first number of FD units is greater than the maximum number of FD units.

18. The method of claim 10, wherein the first threshold value for configured FD units is a minimum number of FD units for which to report channel state information.

19. The method of claim 18, further comprising transmitting a channel state information report without frequency domain compression in response to determining that the first number of FD units is less than minimum number of FD units.

20. The method of claim 10, wherein the second threshold value for reported FD units is a maximum number of reported FD units, the method further comprising reporting the maximum number of reported FD units as a UE capability.

21. The method of claim 20, further comprising dropping the channel state information report in response to determining that the second number of FD units is greater than the maximum number of reported FD units.

22. The method of claim 20, further comprising transmitting a previous channel state information report in response to determining that the second number of FD units is greater than the maximum number of reported FD units.

23. The method of claim 20, further comprising transmitting a channel state information report for the maximum number of reported FD units in response to determining that the second number of FD units is greater than the maximum number of reported FD units.

24. The method of claim 10, wherein receiving the second FD unit configuration indicating the first set of configured FD units for which to report CSI comprises receiving a configuration of a set of sub-bands for which channel quality indicator (CQI) is to be reported, the method further comprising:

receiving a value indicating a number of FD units per sub-band for which a PMI report is requested;

determining the first number of FD units based on a multiplication of the number of sub-bands and the value; and computing the CQI for a sub-band using the PMIs of all of the FD units associated with the sub-band.

25. The method of claim 10, wherein receiving the second FD unit configuration indicating the first set of configured FD units for which to report at least a PMI comprises receiving a configuration of a set of FD units as a bitmap, wherein a length of the bitmap is equal to a total number of FD units, a "1" value in the bitmap indicates the first set of configured FD units, and wherein a channel quality indicator for a sub-band is computed using all of the FD units associated with the sub-band.

26. The method of claim 25, further comprising, for a sub-band for which a CQI report is requested associated with no FD units for which PMI report is requested, determining at least one of, dropping the CSI report, reporting an outdated CSI, or reporting out of range for the sub-band.

27. The method of claim 25, further comprising, for a FD unit for which a PMI report is requested associated with no sub-band for CQI, reporting no CQI value for the FD unit or reporting no PMI for the FD unit or reporting a CQI for the FD unit.

28. An apparatus for wireless communication, comprising:

a transceiver;

a memory configured to store instructions; and one or more processors communicatively coupled with the transceiver and the memory, wherein the one or more processors are configured to:

receive a channel state information (CSI) configuration specifying a first set of configured frequency domain (FD) units to be reported;

determine a first number of FD units based on the first set of configured FD units;

select a second number of FD units that is greater than or equal to the first number of FD units;

calculate, for one or more layers, a pre-coding matrix indicator (PMI) for a second set of FD units including a number of FD units equal to the second number of FD units;

allocate, according to a mapping rule, a number of PMIs for the first set of FD units to a subset of the PMIs for the second set of FD units; and transmit a CSI report including the PMIs for the second set of FD units.

29. The apparatus of claim 28, wherein the one or more processors are configured to:

receive a FD unit configuration indicating a PMI granularity;

determine the first number of FD units based on the FD unit configuration and the first set of configured FD units to be reported;

determine the second number of FD units based on the first number of FD units; and determine whether to transmit the CSI report based on whether the first number of FD units satisfies a first threshold value for configured FD units, or the second number of FD units satisfies a second threshold value for reported FD units, or the PMI granularity satisfies the FD unit threshold.

30. An apparatus for wireless communication, comprising:

a transceiver;

a memory configured to store instructions; and one or more processors communicatively coupled with the transceiver and the memory, wherein the one or more processors are configured to:

receive a first FD unit configuration indicating a precoding matrix indicator (PMI) granularity;

receive a second FD unit configuration indicating a first set of configured FD units for which to report channel state information (CSI);

determine a first number of FD units based on the first FD unit configuration and the first set of configured FD units;

select a second number of FD units that is greater than or equal to the first number of FD units; and determine whether to transmit a CSI report based on whether the first number of FD units satisfies a first threshold value for configured FD units, or the second number of FD units satisfies a second threshold value for reported FD units, or the PMI granularity satisfies the FD unit threshold.

* * * * *

UNITED STATES PATENT AND TRADEMARK OFFICE
CERTIFICATE OF CORRECTION

| | |
|---|---|
| PATENT NO. | : 11,424,790 B2 |
| APPLICATION NO. | : 17/424097 |
| DATED | : August 23, 2022 |
| INVENTOR(S) | : Hao et al. |

It is certified that error appears in the above-identified patent and that said Letters Patent is hereby corrected as shown below:

On the Title Page

Please insert item (30) "Foreign Application Priority Data" as follows:
--January 21, 2019 (CN).........................PCT/CN2019/072525--

Signed and Sealed this
Fourth Day of October, 2022

Katherine Kelly Vidal
*Director of the United States Patent and Trademark Office*